United States Patent [19]

den Daas

[11] Patent Number: 4,879,840
[45] Date of Patent: Nov. 14, 1989

[54] METHOD AND AN APPARATUS FOR MECHANIZED SETTING OUT AND HARVESTING OF CHICORY

[75] Inventor: Jan W. den Daas, EV Zeddam, Netherlands

[73] Assignee: Kwekerij de Bollard B.V., Netherlands

[21] Appl. No.: 70,782

[22] Filed: Jul. 7, 1987

[30] Foreign Application Priority Data

Jul. 8, 1986 [NL] Netherlands ............... 8601784

[51] Int. Cl.⁴ ............................................. A01G 31/00
[52] U.S. Cl. .................................... 47/58; 47/63; 47/59
[58] Field of Search ............ 47/1 R, 1 A, 59, 62–65, 47/17, 58

[56] References Cited

U.S. PATENT DOCUMENTS

| | | | |
|---|---|---|---|
| 3,824,736 | 7/1974 | Davis | 47/17 |
| 3,879,892 | 4/1975 | Di Giacinto | 47/58 |
| 3,923,332 | 12/1975 | Shirouzu | 111/2 |
| 3,935,673 | 2/1976 | Robins | 47/58 |
| 4,166,341 | 9/1979 | Vestergaard | 47/59 |
| 4,327,538 | 5/1982 | Milhem et al. | 47/59 |
| 4,379,375 | 4/1983 | Eisenberg | 47/65 |
| 4,505,068 | 3/1985 | Kaneko | 47/59 |

FOREIGN PATENT DOCUMENTS

1045870  10/1983  U.S.S.R. ........................... 47/59

Primary Examiner—Danton D. DeMille
Attorney, Agent, or Firm—Mason, Kolehmainen, Rathburn & Wyss

[57] ABSTRACT

The invention relates to a completely mechanized method for raising and harvesting chicory and similar crops raised in sprouting trays. Thereby roots held in supply are fixed in rows in or at roots containers, formed by stitching pins, stick on combs or rows of cups, said roots containers with roots being positioned into or on sprouting trays for raising of chicory heads of similar crops. After raising the containers are taken out of the sprouting trays and are conveyed to a harvesting station, where the raised chicory heads or similar crops are separated from the roots.

19 Claims, 7 Drawing Sheets

METHOD AND AN APPARATUS FOR MECHANIZED SETTING OUT AND HARVESTING OF CHICORY

The invention relates to a method and an apparatus for mechanised setting out and harvesting of chicory and similar crops on raising in shooting trays.

Chicory is a biennial crop, sown early May outdoors, preferably on light clay soil. The chicory grows out during the summer season and develops a root-stock, the so-called "chicory-pin", which is harvested in the autumn. After harvesting these chicory-pins are supplied to chicory-forceries of chicory-shooters, where the actual chicory growing, the so-called shooting, takes place. The chicory-pins, delevered to the chicory-shooter, are stored in a refrigerated area at a temperature of 1° to −1½° C. At the temperature of −1½° C. the roots may be stored during the full season, so that the chicory-roots, harvested in October/November, may be stored until August of the next year. Thus chicory can be grown presently all year round.

This growing is presently carried out in so-called shooting trays, usually wooden trays with a plastic inner lining, wherein the roots are set out, whereafter the shooting trays are stacked on top of each other and are positioned in a dark area, the so-called shooting cell, which is provided with an air ventilating system as well as a water circulation system. On shooting water is supplied to the upper tray of a stack, said water running to the next tray thereunder via an overflow etc., according to a cascade system, comprising on occasion 6 to 8 trays on top of each other with a mutual spacing of e.g. 50 cm, at any rate sufficient height to allow chicory-heads to develop on the roots. The duration of the growing process may be controlled by means of both the temperature of the water as well as the temperature of the air, and amounts on average to 21 days. After completion of this growing process the water in the shooting cell is closed down, and the trays are taken out of the shooting cells and are then harvested.

This harvesting was hitherto done manually. In some systems the heads are broken away with the roots remaining in the shooting-tray, in other systems the chicory root with head is taken out of the tray and is broken away from the head. The chicory root itself is disgarded and the heads are sorted in various qualities.

The setting out and harvesting of chicory is up to now manual work, and requiring thereby rather much labour. About 100 hours of labour are required for setting out per hectare. For harvesting about 400 hours of labour, and that applies then for enterprises, which have achieved a proper degree of mechanisation.

The invention has as an object to provide a method and apparatus, whereby the setting out and harvesting of chicory and similar crops may take place completely or substantially completely in a mechanised manner.

To that end the invention provides a method as described in the introduction, characterized in that roots are fixed in rows into or at root-containers, which are subsequently positioned in or on sprouting trays for raising of chicory heads or other crops, and that the containers are removed from the sprouting trays after raising, and the raised chicory heads of other crop are removed from the roots.

The essence of the invention resides in particular in that the roots are no longer processed per piece, but per group, which may be treated in its entirety. Even if no further mechanisation would be applied, this implies in itself already a substantial saving in labour.

There are various possibilities for the root containers. Thus tack-pins my be used as root-containers, which are put through roots supplied, and are subsequently positioned into the sprouting trays with tacked together roots. It will be obvious, that this system of tack-pins is eminently suited for mechanisation, and that also the setting out of the roots on the sprouting trays may be carried out in a mechanised manner. The tack-pins should not be too thick, as otherwise too large holes would be bored through the roots with disadvantageous consequences thereof for the cultivation. The tack-pins should moreover consist of a material, that will not affect the roots, for example stainless steel.

Another possibility are root-containers, comprising one or more rows of cups, wherein the roots are positioned. In this solution there is the advantage that the roots remain undamaged, but the disadvantage that actually a pre-selection has to take place, as the root pins have various thicknesses.

According to a preferred embodiment of the invention, which has appeared to be most effective, the root-containers consist of combs with an elongate support bar, provided on one or both support surfaces with a row of tack-pins, whereon the roots are tacked. A double comb is preferred therein, as this halves the rather large number of combs actually required, while moreover such a comb, loaded on both sides with roots, can be handled more balanced. The combs may be made with a steel bar, a wooden bar or a plastic bar with a length adapted to the length of the sprouting trays, while the prick-up pins protruding frm the sides are of a materal, that does not attack the roots, for example stainless steel. The length of the pins is adapted to the smallest width of a chicory root, and the mutual distance in a row of pins is selected such, that the chance is eliminated, that thinner roots may end up between two pins in a row to be pricked up. On pricking up to roots care may be taken in a manner, as much as possible mechanised, that the roots supplied are arranged in a row with their upper sides, the so-called necks, at the same level, whereafter the comb is pressed into the roots. This process may easily be mechanised, whereby a high production capacity may be achieved.

The harvesting of the raised chicory may be done efficiently by clamping the containers with roots fixed thereon by means of a clamping devide, after they have been removed again from the sprouting trays, whereafter the heads raised may be separated mechanically from the roots. In particular for the comb-like root-containers an efficient clamping may be provided, in that after removal of the combs from the sprouting tray a face or groove is milled at the side facing away from the support bar and parallel therewith, wherein a jaw of a clamp is brought to catch. Hereby a good catch is obtained which is of importance for an effective separation of the chicory heads raised.

In particular with the comb in double execution whereby each of both support surfaces has a row of roots pricked up, wherein such a plane or groove is milled, may in addition be milled to a wedgelike excision advantageously at the lower side of the double row of roots, where the grown out roots are suspended, a wedge-like device being inserted therein, together with the two clamping jaws providing the clamping of the roots. This wedge may serve in addition for removal of the roots from the comb after separation of the heads, for example by having this comb exist of two shearing out components, which, mechanically controlled, push the roots away from the prick-up pins. For the separation of the heads from the roots there are various possibilities. Such it is possible to separate the heads from the roots by means of a mechanical knife or push off device.

It has appeared particularly suitable that the heads are separated from the roots by subjecting the root-container with clamp to an accellerated movement, followed by sudden braking. This so-called "beating off" may for example take place by allowing the clamping jaws (in case of a double comb) together with wedge to hinge at the end of a lever arm to a falling action on a stop-block, whereby the heads separate from the roots held in position. In order to take care that the heads are not damaged, it is to be preferred that they are collected in an impact absorbing medium, for example water. This water may be allowed to flow along a water track and serves then simultaneously as transport medium for the chicory harvested.

An apparatus or mechanised setting out and harvesting of chicory and similar crops on raising in sprouting trays is, according to the invention, characterized by:

means for setting out of roots in sprouting trays, comprising:

conveyor means for the supply of roots arranged in rows, fixing means for fixing the supplied rows of roots to root containers, and means for conveying the root containers provided with rows of roots into or on sprouting trays, and by means for harvesting the heads raised from the roots, comprising:

means or discharging the root containers from the sprouting trays, means for clamping of the rows of roots at the root containers, means for separating the heads raised from the roots, means for discharging the separated heads, means for discharging the roots from the root containers, and means for the discharge of the roots. It is efficient to use thereby the root containers consisting of combs with an oblong bar, provided at both sides with a row of protruding pins.

On using such double combs, the invention provides that the conveying means for supplying roots comprise a conveyor belt, separated into two parts by the oblong slit, and comprising lay in fields regularly distributed over its length, the length thereof corresponding with that of a comb, and wherein roots are laid down transverse to the longitudinal direction of the belt with their upper ends directed to one side and That the fixing means comprise devices to position each time a comb at a fixing station under a first lay in field of the conveyor belt with one of its rows of pins directed upward on the slit, means for pushing upward the comb through the slit, whereby the roots are pricked up in the first lay in field, while simulatenously a counter pressure device is pushing against the roots, means for positioning of the comb provided with a row of roots above a second lay in field with its second row of pins directed downward, and means for pushing the comb downward, whereby the roots are pricked up in the second lay in field under simultaneous action of a counter pressure device from the bottom side.

In principle the execution may be such, that the combs are pushed upward through the slit in the conveyor belt at a fixed fixing station in sequence for pricking up of a first row of roots, and subsequently after supply of a subsequent row are pushed downward again into a subsequent lay in field to prick up the second row of roots. For such an execution the counter pressure device at the bottom side should be movable downward, in order to be able to provide space for a new comb to be moved upward from below.

Another possibility, which is presently preferred, is to take care, that there are means to displace a comb which was moved upward through the slit in the conveyor belt from a first working position at the first lay in field toward a second working position at the second lay in field located in front thereof, whereby during this displacement the conveyor belt is at a standstill.

The counter pressure devices may efficiently consist of little air pressure cilinders, directed perpendicular to the conveyor belt and located next to each other. As the roots laid out in a row may be of various thickness, it is then preferable, that the little air pressure cilinders are provided with hinging heads, so that a tight pushing against the roots is guaranteed in all cases.

As observed already earilier on, it is of importance, that during pricking up, which should be done in the neck of the roots, the roots are positioned in such a way, that the upper ends of the necks are located at the same level just beyond the edge of the slit. Such a positioning however has the disadvantage during the supply of the roots on the conveyor belt, that there is a chance, that roots thus positioned may fall through the slit. It is therefor preferred, that this positioning is only started once the conveyor belt is at a standstill, that is to say at the fixing station. Thereto the invention provides, that a positoning device is present, that bears the upper ends of the roots on the slit in the conveyor belt.

As observed already earlier on it is advisable to mill the roots mounted on the containers on harvesting, adapted to the clamps used thereby.

To that end the apparatus according to the invention may be characterized in that milling means, which are preset to the clamping means, are present, which mill the roots of the root containers discharged from the sprouting trays, in correspondence with the clamps of the clamping means. In particular it may be efficient thereby if the root containers consist of the said combs, the execution being such that the milling means comprise milling devices, which mill a groove into each one of the two rows of roots at a comb at the outer side at the level of and parallel with the comb, and the the clamping means comrpise to clamping jaws, which clamp at the grooves.

For a proper clamping their should not be any play between the two rows of roots, fixed on a comb, and in order to guarantee this the apparatus according to the invention may in addition be carried out in such a way, that the milling means in addition comprise a milling device, that mills the bottom side of the two rows of roots on a root container V-like, and that the clamping means comprise a wedge device, that may be pushed into the milled area.

For the separation of the heads from the roots the apparatus according to the invention has mechanically acting means. These may comprise a shearing device, that is moved over the upper side of the roots at a container.

Especially efficient is an apparatus with the characteristic, that the means for separating the heads from the roots comprises means, which subject the roots clamped at a comb to an accellerated movement, followed by abrupt braking.

Thereby the means for accelleration and abrupt braking may comprise a hinging arm, connected with the clamping jaws, and a stop-block, whereby the clamping jaws with clamped in container are thrown against the stop-block in an adjustable manner. A practical execution is hereby, that the clamping jaws with clamped in container fall on the stop-block, whereby the gravity provides the required accelleration and the stop-block the abrupt braking.

With a view to collecting and discharging the separated heads, the apparatus according to the invention provides further, that the sheared or cut of heads are collected in a conveyor track of running water.

In addition the apparatus should comprise means for mechanical removal of the roots from the containers, after separation of the heads from the roots, For the couble-comb execution this may be done efficiently by means of the wedge device. To that extent the invention has the characteristic, that the wedge device has two removable parts, which after separation of the heads from the roots push the roots from the comb, whereafter the roots are discharged to be used as fodder for cattle.

In particular with a view to an efficient pushing away of the roots by means of the wedge device the container comb may be executed in such a way, that it consists of an elongate support bar, of which boths sides are provided at the bottom side of a row of perpendicularly extending pins. For the combs thus made the higher force is exerted on expansion by the wedge at the level of the pins, so that the roots may be pushed easily from the pins with the smallest chance of damage.

The invention will now be elucidated by means of the following description, with reference to the drawing. In the drawing show(s).

Figure 1:
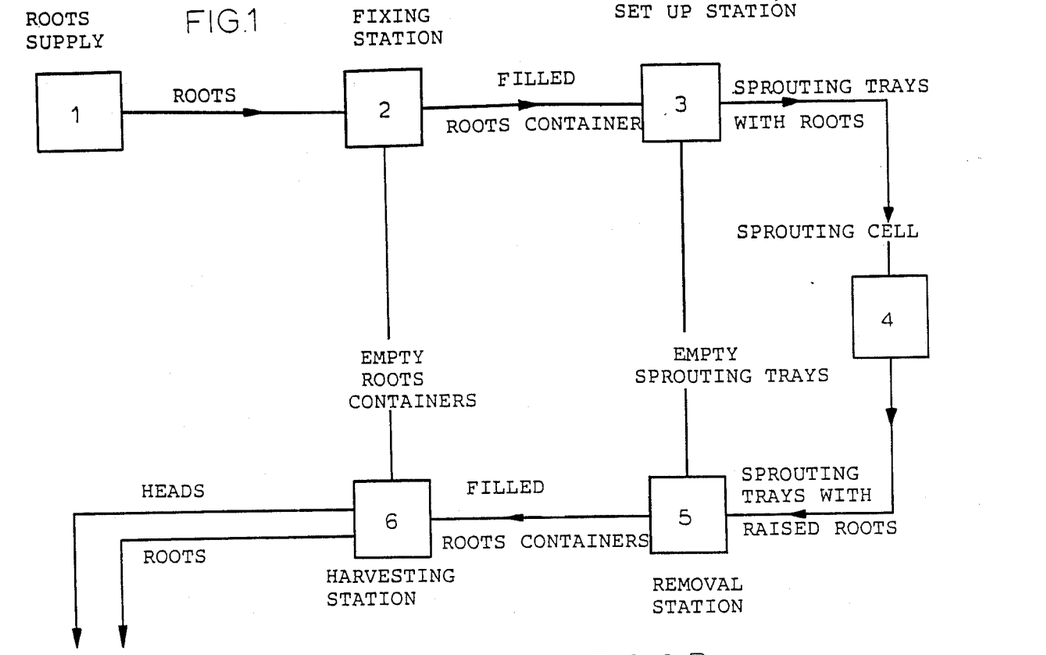
FIG. 1 a basic scheme of the functioning of the complete system according to the invention.

In FIG. 1 a basic scheme is shown of the functioning of the system according to the invention. From a roots supply 1, where roots are stored at a low temperature of 1° to −1½° C., roots are supplied via a conveyor belt to a fixing station 2, where they are attached in rows to root containers. From there the filled root containers, that is comprising rows of roots, are conveyed to a set up station 3 where they are set up on empty sprouting trays. The sprouting trays with roots are finally conveyed to a sprouting cell 4, where under climatized conditions chicory is aised in some weeks in a hydroculture.

After raising the chicory the sprouting trays are conveyed from the sprouting cell 4 to a removal station 5, where the root containers with roots are taken from the sprouting trays, which are returned again to the set up station directly or via a stop-block. The root containers are conveyed from the removal station to a harvesting station 6, where the chicory heads are separated from the roots, while these are still attached to the containers, whereafter the heads harvested are discharged to a sorting apparatus by means of a conveyor track, to be packed. The roots are also discharged and serve as fodder for cattle.

Figure 2A:
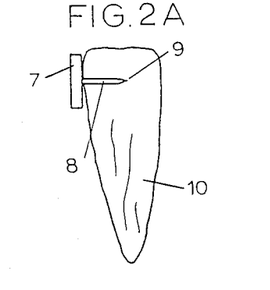
FIGS. 2A and 2B a singular comb with roots, in cross-section and longitudinal section respectively.
Figure 2B:
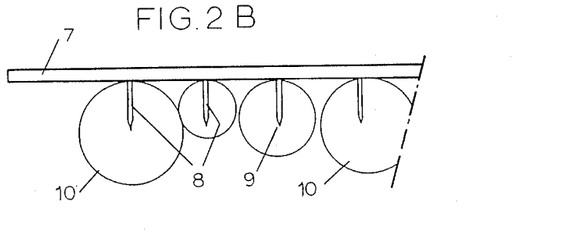

As observed already earlier on, there are various possibilities for the root containers. Preferred however is a comb which unilaterally or preferably bilaterally, is provided with a row of stick-up pins. Such a unilateral comb is shown in cross- and longitudinal section in FIG. 2A. As shown the comb consists of a comb bar 7 with at one side a row of stick-up pins 8, which are pointed at their ends 9. Roots 10 supplied from the root supply are pricked-up arranged in a row on these pins, in order to process such a fixed row further on as one unit. The comb, and in particular the pins, should be of a material, that will not react with the roots stuck thereon; if for example iron pins would be used, the iron oxides formed would result in an undesired manner to blue-colouring of the chicory to be raised. A suitable material for the pins is stainless steel. Also other materials, for example pins of hard plastic, are suitable. The material of the comb bar should be such that the comb bar has sufficient stiffness and will not bend trough. Suitable materials are hard plastic material and stainless steel. Also other materials which meet the requirements set, may be used.

Figure 3A:
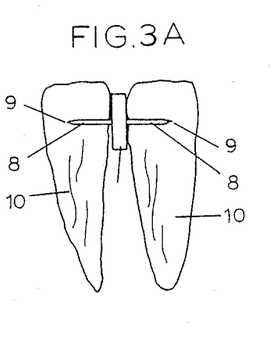
FIGS. 3A and 3B a double comb with roots in cross-section and longitudinal section respectively.
Figure 3B:
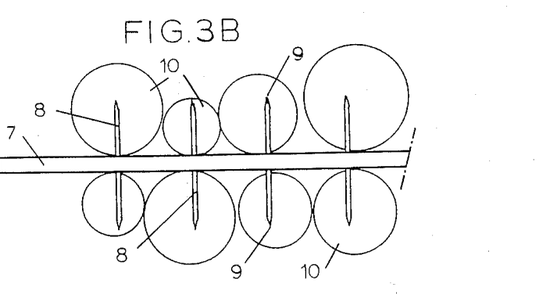

In FIGS. 3A and 3B a roots comb is shown in double embodiment. This double embodiment offers the advantage over the single embodiment, that half the number of combs of unilateral embodiment will suffice, while moreover handling of these double combs is easier, because the points of the roots hang downward by gravity, so that the comb is in the proper position to be set up on sprouting trays.

Figure 6:
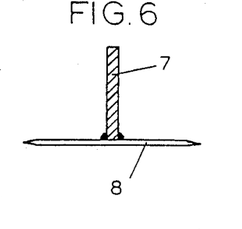
FIG. 6 in cross-section a preferred embodiment of a root-comb.
Figure 7:
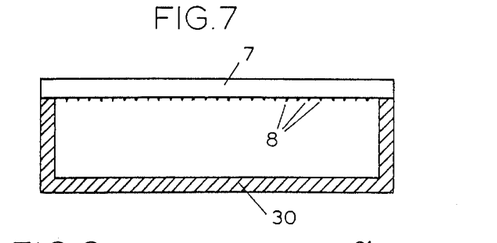
FIG. 7 in longitudinal section this comb positioned in a sprouting tray.

A preferred embodiment of such a double comb is shown in FIG. 6. Thereby the two rows of pins 8 are attached at the bottom side of the comb bar 7, which is of advantage in particular for efficient clamping and later on removing o the roots during harvesting.

Figures 4A, 4B:
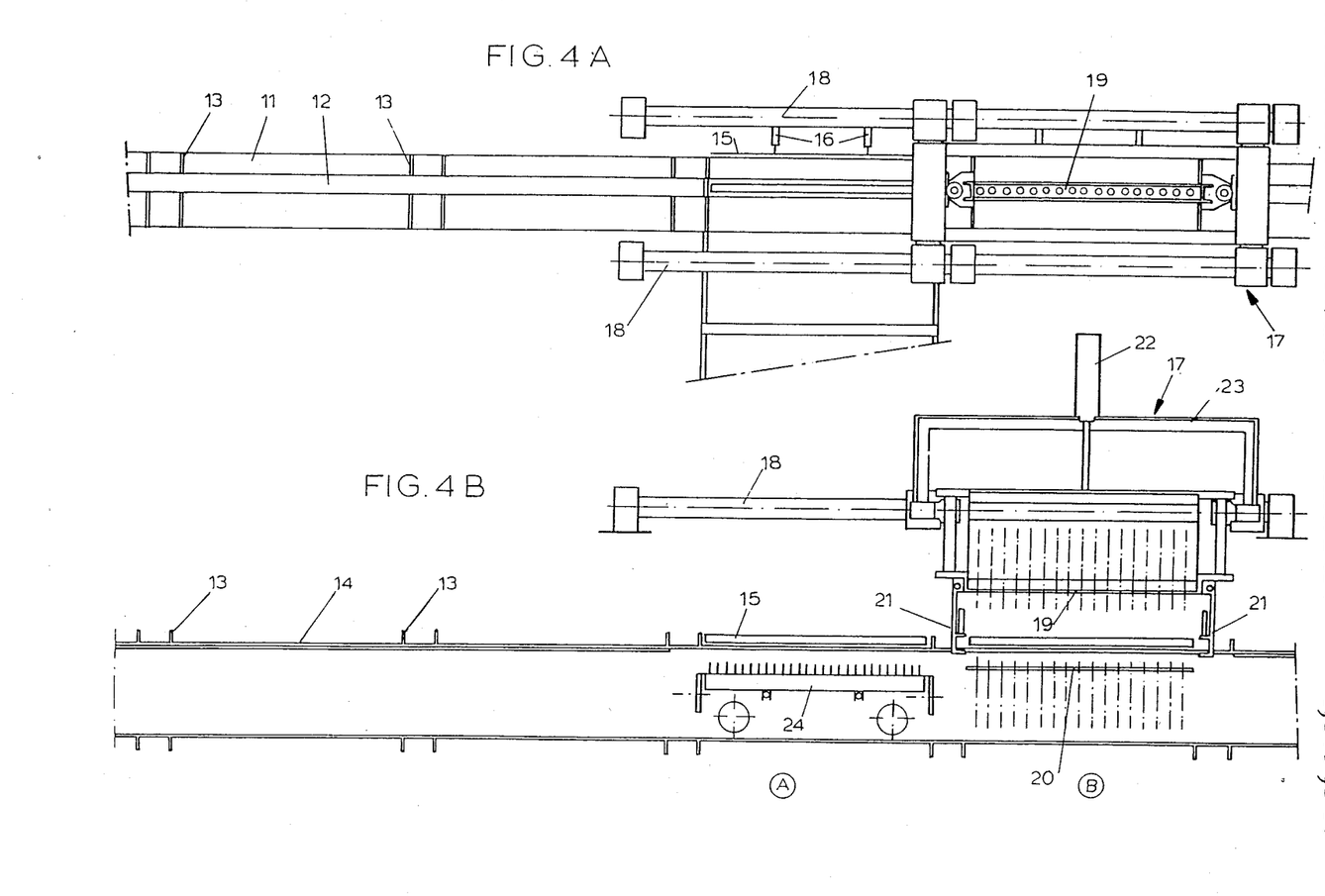
FIGS. 4A and 4B an embodiment of a fixing apparatus with supply belt for roots, shown in cross-section in top vue and in longitudinal view respectively.

In FIGS. 4A and 4B a top view and side view are shown in cross section of a possible embodiment of a fixing apparatus to fix rows of roots at double combs. To the left of the actual fixing apparatus a part is shown of a conveyor belt 11, whereon the roots to be fixed are supplied from the roots supply to the fixing station.

This conveyor belt 11 is divided into two parts, by a groove 12 extending in longitudinal direction, which are moved forward simultaneously. The conveyor belt is provided with baffles 13, which determine lay-on surfaces 14, whereon rows of roots are laid out cross to the conveyance direction with their neck on the narrower part of the conveyor belt (in FIG. 4A above).

The roots (not shown in the figure) are conveyed to the fixing station thus laid out.

This fixing station has two fixing positions A and B. At the first fixing position A the roots are positioned in such a way, that the necks of the roots will pass just beyond the groove. This latter is required, as the actual pricking up occurs through the groove and the roots should be prickd on at the level of their necks 10 (see FIG. 3A). An earlier positioning of the roots in this position is not quite possible, as otherwise during conveyance the risk would exist, that in particular thinner roots would fall through the groove. The roots are properly positioned at position A by means of a thrusting device, consisting of a beam 15, which pushes against the upper sides of the roots laid up by means of plungers 16, and displaces these to the desired position.

Guiding rails 18, over which a lorry 17 may be moved from position A to position B and vice versa, are present over the positions A and B. The lorry is provided with a systemof little pressure cylinders 19, oriented in a row over the groove 12. Under the conveyor belt at position B is similar system of little pressure cylinders 20, equally oriented with respect to the groove 12.

The lorry has further two hinging jaws 21, with which a roots comb may be caught at both its exteme ends. A lifting cylinder 22, attached to the support frame 23 of the lorry, serves to lift and to lower the complete interior of the lory, consisting of the system of little pressure cylinders 19 and jaws 21.

At position A is also a push up bar 24 under the conveyor belt 11, which serves to lift a root container, supplied there in cross position, to and through the groove 12.

This apparatus functions as follows. Always two sections 14, filled with roots are pushed forward to the positions A and B. At that moment the lorry 17 is over position A, and after stopping the conveyor belt the pushing bar 15 positions the roots in the first section 14, located one position A, in the desired position, whereby the necks of the roots extend just beyond the groove 12. Subsequently the push up bar 24 pushes an empty container comb 7, 8 with one row of pins positioned thereon directed upward, which catch into the roots located thereabove, upward. Simultaneously the plungers of the row of little pressure cylinders 19 push downward against the necks of the roots in order to provide a desired counterpressure on piercing of the roots. After piercing of the roots the jaws 21 take over the roots comb and the cylinder 22 lifts the jaws with roots comb further upward, whereafter the lorry travels over the guide rails 18 from the position A to the position B. There the comb with its empty pins directed downward, is brought upward agian, as the plunger 22 lowers the lorry again, until the protruding pins penetrate into the roots located there, while from the bottom side the presure cylinder system 20 moves upward, in order to provide the desired counterpressure together with the plungers.

Figure 5:
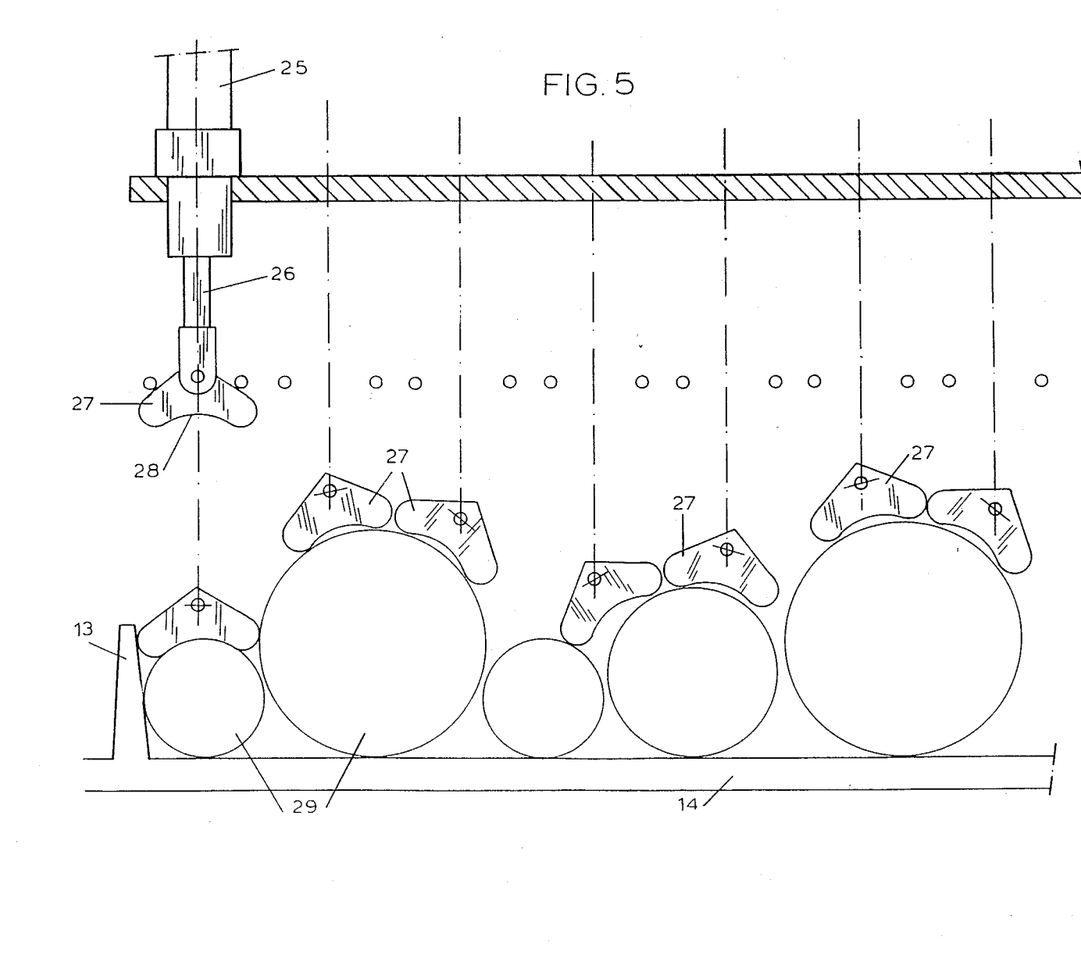
FIG. 5 in side view an embodiment of the small air cylinders to be used therein.

In FIG. 5 is shown a further embodiment of such a system of small pressure cylinders. This comprises a row of cylinders 25 provided with plungers 26, which have a hinging head 27, the extreme end 28 being rounded in. Such a system is efficient, because the necks of the roots are not of the same size and thus of unequal height. As can be seen in FIG. 5 various necks 29 may deviate substantially in size, and by making the plunger heads hinging and rounded out, care may be taken, that a desired even pressure is exerted on all roots, regardless their dimension.

After providing the roots combs thus on both sides with a fixed row of roots, the conveyor belt starts moving again, and the filled roots combs are conveyed through to the set up station 3, where by means of suitable jaws and the like the cxombs are positioned next to each other on sprouting trays 30, whereby the roots of the combs hang down into the sprouting tray. For mechanised setting up on sprouting trays there are of course many possibilities, which will be obvious to those versed in the art, and which need not be elucidated here in more detail.

The sprouting trays thus provided with roots are subsequently conveyed through to the sprouting cell 4, where the actual raising, or the chicory raising, takes place. This occurs in the usual manner, whereby the sprouting trays, stacked on top of each other in cascade, are subjected to a hydroculture with water let in from the top, that runs from higher located sprouting trays to lower located sprouting trays taking into account desired conditions of temperature. The raising of chicory in that way takes about three weeks.

After the raising of the chicory has been completed, the sprouting trays are conveyd to removal station 5 by means of a suitable conveyor system, where the roots combs with roots provided with heads attached thereon, are lifted vrom the sprouting trays by means of suitable jaws, the latter being returned to the set up station 3, possibly via a temporary stop-block. The filled roots contianers are conveyed through to the harvesting station 6 where the actual harvesting takes place, by means of an additional conveying system.

On harvesting the heads should be separated from the roots, while these are still attached to the combs. This however is not possible without the roots being tightly clamped on the combs, as otherwise the roots might get loose from the combs during separation.

Figure 8:
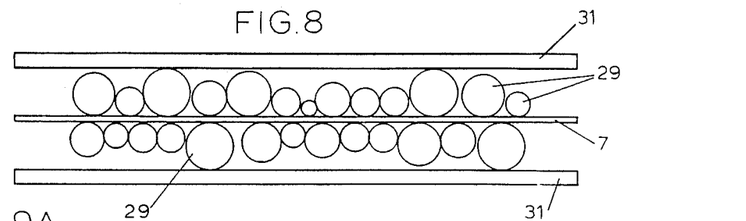
FIG. 8 in top-view a comb with two rows of unmilled roots at clamping.
Figures 9A, 9B:
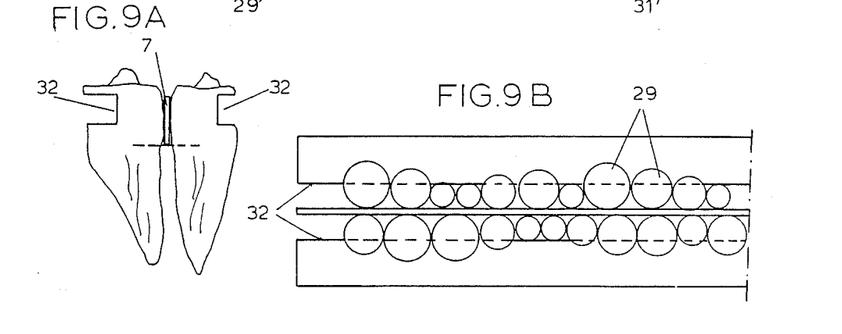
FIGS. 9A and 9B in cross-section and in top-view respectively shown schematically, the side-milling at such a comb.
Figure 10:
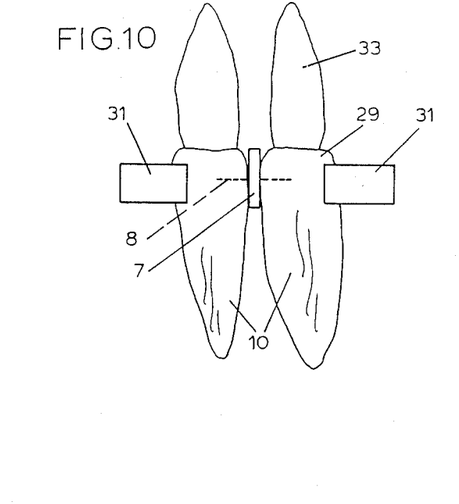
FIG. 10 a cross-section of this comb, clamped in with milled roots, whereby the heads of chicory are also shown.

With this clamping of the roots on the comb however the problem arises, that the necks of the roots are not of the same size. In FIG. 8 a top view is shown of a roots comb 7 with two rows of necks of roots pinned thereon, and it can be clearly seen that a clamping with two clamping jaws 31, which compress the roots from the sides, is not adequate, as the smaller necks of roots remain outside the reach of the clamping range. This it is provided by the invention, that the roots, prior to being clamped, are milled, in order to take care, that a clamping jaw may act in a similar manner on all roots, which are attached to a comb. This is shown schematically in FIGS. 9A and 9B. A groove 32 is milled from the side in both rows of roots, attached to the comb 7, whereby the milling is so deep, that all roots of a row are reached. Thus excellent catching surfaces are obtained for clamping jaws 31, which now (see FIG. 10) seize into the necks of all roots 10. As can be seen in FIG. 10 the position on clamping is such, that the heads 33 are directed upward and the roots 10 are pending downward.

Figure 11:
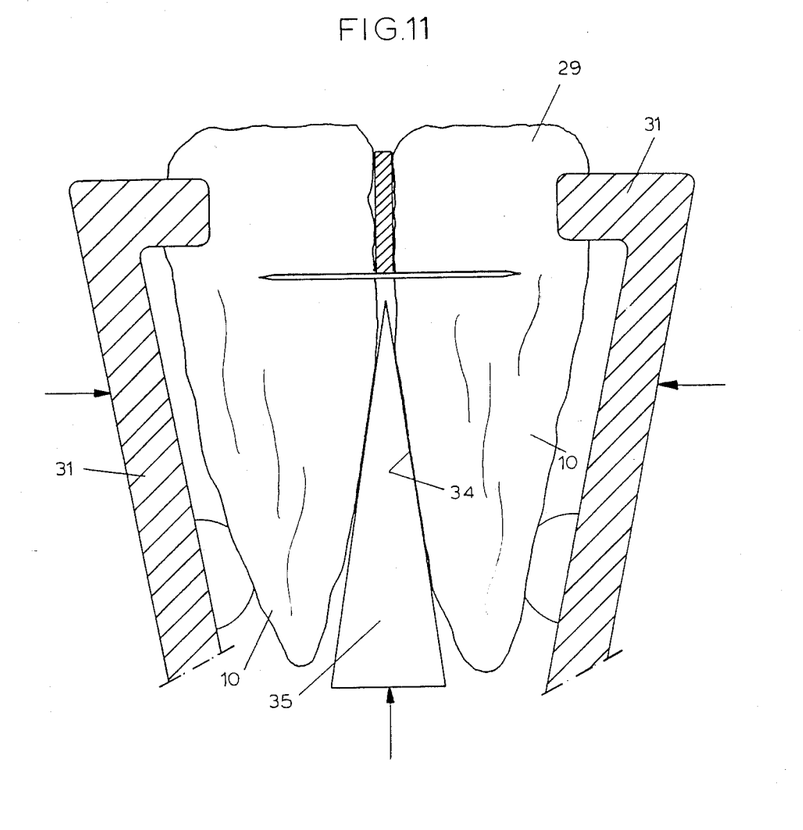
FIG. 11 in cross-section an embodiment of the roots at a double comb, which are milled and clamped both at the side and at the bottom.

Such a clamping has the disadvantage, that it acts on only a limited part of the roots, and that there remains to exist a substantial play as the pending lower sides of the roots (see FIG. 10) show substantial interspaces. Such a bilateral clamping is also less suitable in the case, wherein the pins of the combs are attached to the bottom side, such as in FIG. 6. In order to meet this disadvantage it may be further be provided, the the bottom side of the two pending rows of roots at a comb are milled V-like, and a wedge-like device is inserted in the created wedge area, taking care of the desired filling. Such an embodiment is shown in cross-section in FIG. 11, where for a comb of the type shown in FIG. 6 the roots are milled both from the side as at the end, and a wedge 35 is inserted in the milled area 34, which together with the clamping jaws 31, which catch on in the neck of the roots in the milled areas, provide for a very rigid clamping, suitable for mechanical harvesting of the heads.

Figure 12:
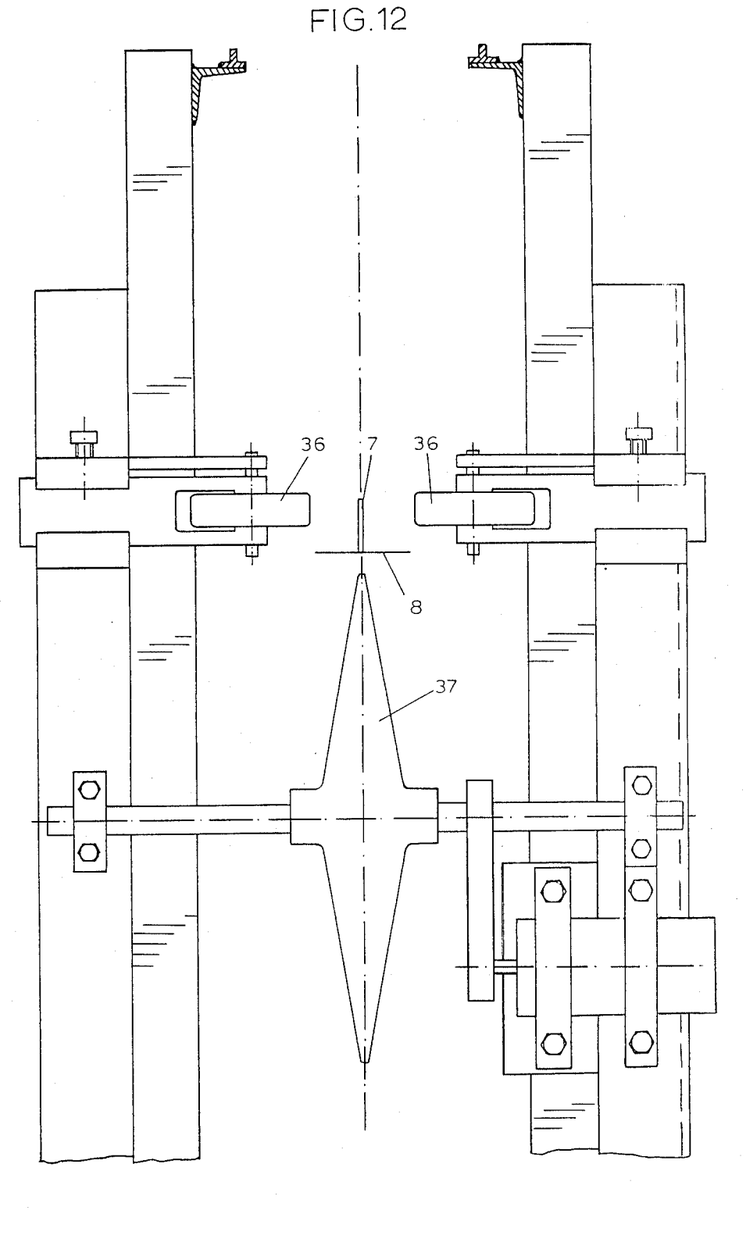
FIG. 12 in side-view a milling apparatus.

In FIG. 12 an apparatus is shown in cross-section, with which the milling is executed. The containers 7 with the roots with heads pinned on pins 8 (not shown) are passed across the the plane ofthe drawing and pass thereby two horizontal milling wheels 36,which take care of the milling at the side, and a conical milling wheel 37, that takes care of the wedge-like milling at the bottom side of the roots.

The separation of the heads from the roots may now be eachieved in various manners, for example by mechanical shearing of the heads from the rows of clamped roots, or by cutting off. However all these possiblities have inherent disadvantages and as has appeared, it is to be preferred to perform the separation by subjecting the roots with heads to an accellerated movement, followed by abrupt braking, or stopping respectively. This may be realized in practice by socalled "beating of", whereby a clamped container with roots and heads falls on a stop-block or buffer with a specific velocity, whereby the heads are disconnected from the roots.

Figures 13, 14:
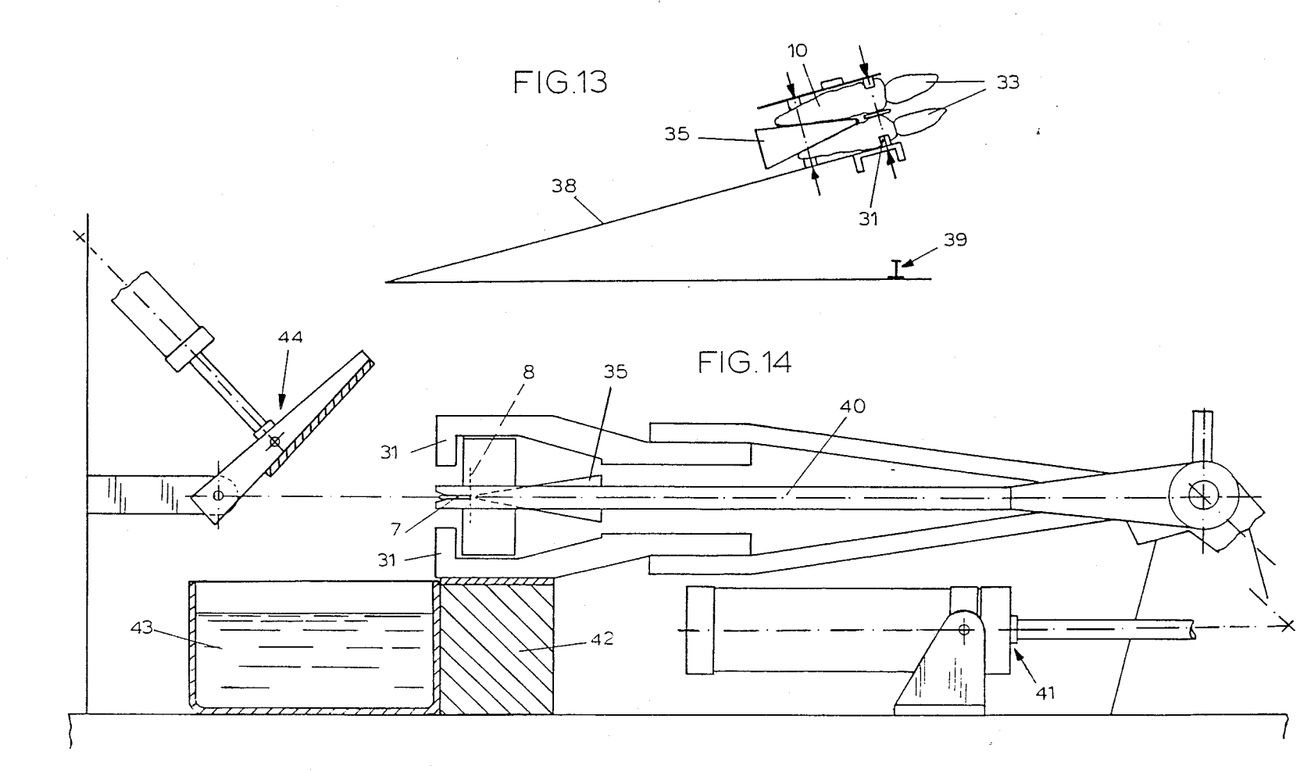
FIG. 13 an outline wherein the principle of the removal is shown.
FIG. 14 is side-view in cross-section of a clamping apparatus with hinging removal mechanism.

The principle of this beating of is shown schematically in FIG. 13. A hinging arm 38 has mounted at its extreme and facing away from its hinging axis, the clamping device consisting of jaws 31 and wedge 35, and this totality falls hingingly on stop-block 39, whereby the heads 33 get loose from the roots 10.

FIG. 14 shows a practical embodiment of such a cut off mechanism in longitudinal side-view. Two hinging arms 40 hold at there extemes a comb 7 with pins 8. To the shaft of the hinge are also connected arms, which hold the clamps 31, while the arm 40 holds the wedge 35. This mechanism with clamped roots and heads (not shown) can move from a vertical position, wherein a roots container is advanced and fixed, making a tipping movement to horizontal, whereby the clamped container hits the stop-block 42 with the desired speed, whereby as a consequence the protruding heads will break of. In order to avoid damage to the heads, they are collected in a water gutter 43, whereby the water forsm an excellent medium to catch the falling heads without damage. In addition this water forsm an efficient conveying means in the form of a track of running water, wherein the chicory heads are discharged to a sorting- and packing station. A shearing mechanism 44 is also present to separate from the roots possible chicory heads incompletely separated, as yet.

After having thus separated the heads from the roots, the roots still have to be separated from the container, which may be done very efficiently by means of the wedge 35 by making the latter with two expanding scisor halves, which may be spread hydraulically or in some other way, whereby the roots are pushed from the combs. It will be obvious, tht such an action is most efficient for pins at the bottom side of the comb, as the higher shearing force will then be at the level of the pins themselves, so that with the least resistance and the smallest chance of further damage the roots can be removed in order to be discharged subsequently via a suitable conveyor track, for example also a running water track, of a conveyor belt.

In the above the invention has been elucidated by means of an embodiment, based on the use of bilateral combs as roots containers. The advantages of such double roots container are evident. The use of double combs reduces the number of combs that might be required by half, while moreover the roots containers will always assume the correct position, that is with the roots pending downward. (With a unilateral comb the roots would become scanting, and additional provisions would be required a.o. at setting out in the sprouting trays etc..). In addition the clamping of the roots mat be achieved in an optimal manner, in particular by using the wedges, which serve moreover as removal means for the roots.

It will be obvious that the invention is not limited to the example of the embodiment described above. There are many possibilities, both with respect to the shape of the roots containers as well as with respect to the way wherein these are processed and conveyed, which will be obvious to the expert after the above, and these are considered to be comprised within the scope of this invention.

I claim:

1. A method for mechanized setting up, raising and harvesting chicory comprising fixing chicory roots in rows on holder combs, each holder comb comprising an elongated support bar with extending stick up pins, said holder combs with chicory roots fixed on their stick up pins being subsequently placed in sprouting trays for raising chicory crops, and after raising removing said holder combs bearing raised chicory from said sprouting trays and separating the raised chicory crops from their roots still attached to said holder combs.

2. A method according to claim 1, in which the holder combs are double combs having two rows of stick up pins, a row of chicory roots being fixed on each of said rows of stick up pins.

3. A method according to claim 2, in which after having raised the chicory crops and after removing the holder combs from the sprouting trays, a gripping face for receiving opposite clamping jaws is milled in each of the opposite sides of the double row of roots attached to a double comb, said clamping jaws clamping the roots during the step of separating the chicory crops from their roots.

4. A method according to claim 3, in which a groove is milled in the bottom side of the double row of roots attached to a double comb for receiving an expandable wedge device for aiding the clamping jaws in clamping the roots and for removing the roots from the comb after the separation of the chicory crops.

5. A method according to claim 3, in which the chicory crops are separated for the roots by subjecting the roots fixed to the combs and clamped by the clamping jaws to abrupt acceleration followed by abrupt braking.

6. A method according to claim 5, in which the separated chicory crops are collected in running water as a shock-absorbing conveyance medium.

7. An apparatus for mechanized setting up, raising and harvesting chicory comprising:
sprouting trays for raising chicory, means for setting out chicory roots in said sprouting trays, said means for setting out comprising conveyor means for supplying roots arrangned in rows, holder combs for holding the supplied rows of roots, fixing means for fixing the supplied rows of roots to said holder combs, each holder comb comprising an elongated support bar with extending stick up pins, and means for transferring said holder combs with chicory roots fixed on their stick up pins into said sprouting trays, and means for harvesting the chicory crops raised from the roots, comprising means for discharging the holder combs from the sprouting trays, means for clamping the rows of roots to the holder combs, means for separating the raised chicory crops from the roots, means for discharging the separated chicory crops, means for removing the roots from the holder combs.

8. An apparatus according to claim 7, in which the holder combs are double combs having two rows of stick up pins, a row of chicory roots being fixed on each of said rows of stick up pins.

9. An apparatus according to claim 8, in which the conveyor means for supplying roots comprises a conveyor belt, said conveyor belt being separated into two parts by a groove, and having regularly distributed over its length lay-in sections, the length of the lay-in sections corresponding with that of a comb, and wherein roots are positioned transverse to the longitudinal direction of the belt with the ends of the roots directed to one side of the conveyor belt, and the fixing means comprises devices to position sequentially a comb under a first lay-in section of the conveyor belt with the combs first row of pins directed upward to the groove at a fixing station, means for pushing the comb upward through the groove and a first counter pressure device pushing downward on the roots, whereby roots in the first lay-in section are pinned up by the comb, while simultaneously from the upper side said first counter pressure device is pushing against the roots, means for positioning the comb provided with a row of roots over a second lay-in section with its second row of pins directed downward, and means for pushing the comb downward and second counter pressure device pushing upward on the roots, whereby the roots in the second lay-in section are pinned up under simultaneous action of said second counter pressure device from the bottom side and the means pushing the count downward.

10. An apparatus according to claim 9, including displacing means for displacing a comb passed upward through the groove in the conveyor belt from a first working position near the first lay-in section to a second working position at the second lay-in section lying in front of the first lay-in section, said conveyor belt being at a standstill during this displacement.

11. An apparatus according to claim 10, in which said first and second counter pressure devices consist of small air pressure cylinders positioned next to each other, directed perpendicular to the conveyor belt.

12. An apparatus according to claim 11, in which the small air pressure cylinders are provided with plungers with hinged heads.

13. An apparatus according to claim 9, including a positioning device for orienting the necks of the roots on the groove in the conveyor belt at the fixing station.

14. An apparatus according to claim 8, including milling means and clamping means, said milling means comprising milling device for milling a face in the outer side of each one of the two rows of roots fixed at a comb parallel and in line with the comb, and said clamping means comprising two clamping jaws for clamping the roots.

15. An apparatus according to claim 14, in which said milling means further comprises a milling device for milling the bottom side of the two rows of roots fixed to a comb in a V-like way, and in which said clamping means further comprises a wedge device to be pushed into the V-like milled area.

16. An apparatus according to claim 15, in which said means for separating the crops from the roots comprise accelerating and braking means for subjecting the roots clamped at a comb to an accelerated movement followed by abrupt braking.

17. An apparatus according to claim 16, in which said accelerating and braking means comprise a hinged arm connected with the clamping jaws, and a stop-block, the clamping jaws with clamped-in roots holder comb being thrown against the stop-block in an adjustable way.

18. An apparatus according to claim 17, in which the clamping jaws with clamped-in roots holder comb fall on the stopblock by gravity.

19. An apparatus according to claim 15, in which said wedge device has two spreading parts and after the separation of the crops from the roots push the roots off of the comb.

* * * * *